Feb. 5, 1929.
W. C. BROADWELL
1,701,292
VEHICLE CUSHIONING AND SHOCK ABSORBING DEVICE
Filed April 23, 1926
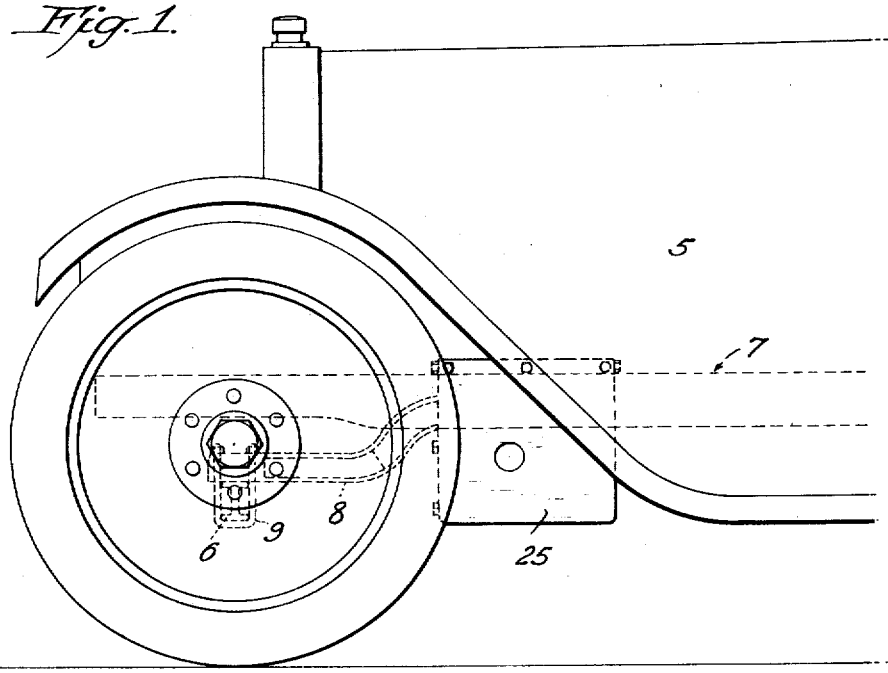
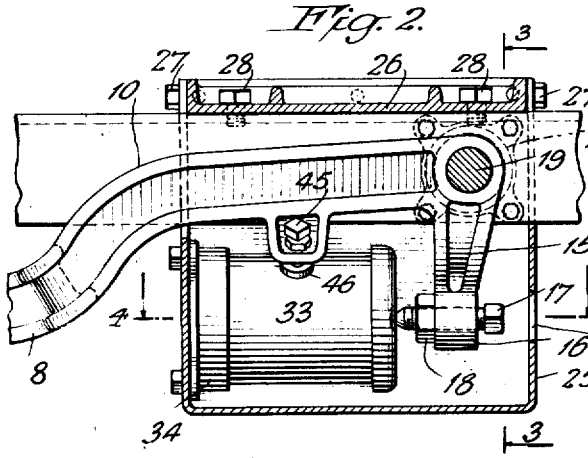
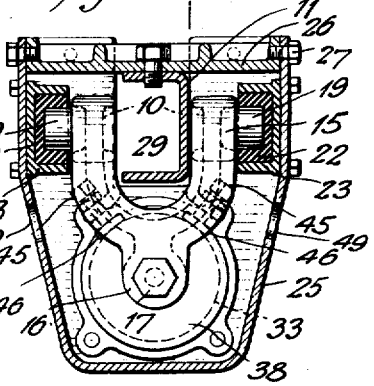
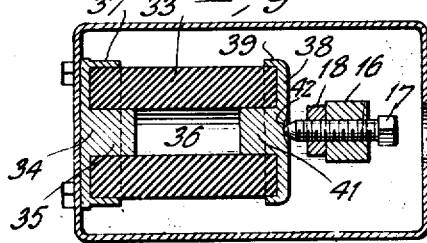
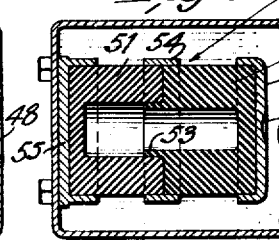
INVENTOR.
W. C. Broadwell
BY
William Turner
ATTORNEYS Patented Feb. 5, 1929.

1,701,292

UNITED STATES PATENT OFFICE.

WILLIAM C. BROADWELL, OF BROOKLYN, NEW YORK.

VEHICLE CUSHIONING AND SHOCK ABSORBING DEVICE.

Application filed April 23, 1926. Serial No. 104,026.

This invention relates to vehicle cushioning and shock absorbing devices and is herein shown as applied to an automobile.

An important object of the invention is to provide a device of the character mentioned which is so constructed as to effectively absorb and relieve the vehicle of excessive shocks, when the axle of the vehicle is suddenly moved towards the frame of the vehicle wheel, and at the same time provide means for effectively restraining certain cooperative elements of the device against undue movement with respect to the vehicle frame as a result of what is commonly termed the "rebound", which takes place immediately subsequent to an impact delivered to the vehicle wheel as it meets and passes over an obstruction in its path of travel.

A further object of the invention is to provide a device of the character mentioned which is simple in construction, reliable in operation, easily installed and capable of withstanding prolonged use.

Other objects and certain advantages of the invention will become apparent from the following description when taken in connection with the accompanying drawings in which—

Figure 1 is a view in elevation showing the device associated with an automobile.

Figure 2 is a vertical, longitudinal, sectional view taken on the line 2—2 of Figure 3, certain cooperative elements of the device being shown in elevation.

Figure 3 is a transverse, sectional view taken on the line 3—3 of Figure 2.

Figure 4 is a horizontal, sectional view taken on the line 4—4 of Figure 2.

Figure 5 is a view similar to Figure 4 but showing a modified form of cushioning element.

In practice, as many of the devices embodying the invention may be employed in connection with a vehicle as there are wheels to the vehicle. However, only one device is herein shown, it being illustrated as applied to an automobile 5, having an axle 6 and a frame 7.

The device, herein shown, includes an oscillatory lever 8 which is arranged longitudinally of the frame 7 and is, at its free end, suitably connected to the axle 6 by means of a shackle 9. This lever 8 may be cast from suitable metal or otherwise fabricated and is formed with a yoke, the legs 10 of which straddle a side member 11 of the frame 7.

A yoke 15 is secured to and preferably formed integral with the ends of the arms 10, the yoke 15 being also adapted to straddle the side member 11, as shown most clearly in Figure 3, and provided at its lower end with a head 16 carrying a set screw 17. The set screw 17 is adapted to be adjusted for a purpose which will hereinafter more clearly appear, and may be locked in a proper adjusted position by means of a lock nut 18, the lock nut being carried by the set screw, as shown in Figures 2 and 4.

At the jointure of the arms 10 with the yoke 15, bosses 19 are formed which function as pivots about which the oscillatory lever 8 is adapted to move. The bosses 19 are carried within cup-shaped cushions or yieldable bearings 22 which are mounted within and supported by suitable cup-shaped retaining elements or housings 23. These retaining elements 23 are rigidly connected to the side walls of a suitable housing 25 which is carried by a cover plate 26 secured to the end and side walls, respectively, of the housing 25 by means of lag bolts 27, the cover plate 26 being, in turn, rigidly secured to the upper flange of the side member 11 by means of lag bolts 28, as shown in Figures 2 and 3. In order that the housing 25 may be applied to the side member 11, as shown, the end walls of such housing are cut away or provided with openings 29 adapted for the reception and accommodation of the side member 11.

Within the housing 25 is arranged a yieldable cushioning element 33, preferably tubular in form and constructed from rubber. This cushioning element 33 is disposed longitudinally of the housing 25 and is supported at one end by means of a socket 34 which is bolted or otherwise suitably connected to one of the end walls of the housing. The socket 34 is formed centrally with a boss 35, which snugly fits the central passage 36 of the cushioning element 33, and is also formed with a peripheral flange 37 which is adapted to snugly engage the peripheral surface of the cushioning element at one end thereof. Upon the other end of the cushioning element 33 is carried a compression plate 38, formed with a peripheral flange 39 which is adapted to snugly engage the adjacent peripheral surface of the cushioning element. The compression plate 38 is also formed centrally with a boss 41 which projects into and snugly fits the central opening 36 of the cushioning element 33. As shown most clearly in Figure 4, the pointed end of the set screw 17 engages the compression plate 38 and projects into a central depression 42 formed therein, the central depression being utilized to always maintain the compression plate 38 centrally located with respect to the pointed end of the set screw.

From the foregoing it will be apparent that when the free end of the lever 8 is moved toward the frame 7, as the automobile wheel passes over an obstruction in its path of travel, such movement is resisted by the cushioning element 33 inasmuch as the yoke 15 moves in a clockwise direction, as viewed in Figure 2, and thereby, through the cooperation of the set screw 17 with the compression plate 38, places the cushioning element 33 under compression. Incident to the release of such compression, the usual "rebound" takes place, and in order to resist such rebound, the cushioning element 33 is utilized to effectively retard the excessive movement of the lever 8 away from the frame 7. In order to utilize the cushioning element 33 to resist the rebound, each of the arms 10 is provided with an offset lug 44 carrying a set screw 45 to the end of which is swiveled a compression button 46 which engages the surface of the cushioning element 33, preferably midway of its length. The set screws 45 may be adjusted to suit various conditions, such, for example, as the weight of the automobile and the size of the cushioning element 33, in so far as its diameter is concerned, and when adjusted to their proper respective positions, they may be locked in such positions by means of lock nuts 47, as will be readily understood. The rebound is resisted by reason of the fact that as the free end of the lever 8 moves away form the frame 7, the compression buttons 46 so move with respect to the cushioning element 33 as to distort the same to a slight degree and at the same time place the cushioning element under radial compression, the degree of compression being dependent upon the extent of movement of the free end of the lever 8 on the rebound.

Automobiles, as well as other vehicles employing springs as cushioning means for the vehicle, are so designed as to maintain the axle at a fixed distance from the frame when the vehicle is without a load. This fact may be taken into consideration in determining, for example, the size of the cushioning element 33 and the composition of the material, rubber, entering into the same, but when the device is first installed, as a substitute for the usual spring construction or as a replacement for the springs of a vehicle already equipped therewith, a slight adjustment of the set screw 17 may be necessary in order to properly position the free end of the lever 8 with respect to the frame 7. This adjustment may be made through an opening 48 formed in one end of the housing 25. If, when the device is first installed, the axle 9 is found to maintain a position too remote from the frame 7, the set screw 17 is so rotated as to permit the frame 7 to move downwardly until the proper space is afforded between the axle and the frame. On the other hand, if, when the device is first installed, the axle assumes a position too close to the frame, the set screw 17 may be so adjusted as to swing the yoke 15 in a counter-clockwise direction, as viewed in Figure 2, and thereby elevate the frame with respect to the axle until the proper space is afforded between the frame and axle. The adjustment just described is preferably made while the set screws 45 are so retracted that the compression buttons 46 are maintained out of engagement with the cushioning element 33. After the proper adjustment between the axle and the frame has been made, the set screws 45 are then run down or adjusted until the compression buttons 46 engage the cushioning element 33 and impinge thereupon. The adjustment of the set screws 45 may be made through openings 49 formed in the side walls of the housing 25. If, after the automobile has been put into use, it becomes necessary to further slightly adjust the set screws 45 to obtain the most effective cushioning effect on the rebound and if it is found necessary to also further adjust the set screw 17, all such respective adjustments may be easily made through the openings 48 and 49 provided for this purpose, as above described.

By reason of the fact that the bosses 35 and 41 snugly fit the passage 36 of the cushioning element 33, escape of air from the cushioning element 33 is prevented when the cushioning element is compressed either during upward or downward movements of the free end of the lever 8. The air thus compressed lends a pneumatic cushioning effect to the device in addition to the cushioning afforded by the cushioning element 33 itself.

In Figure 5 a modified form of cushioning element 50 is shown. This cushioning element includes two abutting sections 51 and 52, the latter of which is formed with a flange 53, engaging the inner surface of the former, as shown. Each of the sections 51 and 52 is closed at one end and the jointure between the two sections is sealed by the flange 53 which overlaps the adjacent end of the section 51. Sealing of the jointure between the two sections 51 and 52 may be further effected by means of a band or ring 54 which encircles the cushioning element and engages adjacent peripheral margins of the sections 51 and 52. The cushioning element 50 is supported at one end by means of a retaining element 55 which is suitably connected to one end of the housing 25, and the other end of the cushioning element 50 is provided with a compression plate 56, having a central depression 57 adapted for the reception of the pointed end of the set screw 17.

As will be readily understood, the form of cushioning element 50, shown in Figure 5, may be substituted for the cushioning element 33, without modifying the above described operation of the cushioning device, since the function and operation of the two forms of cushioning elements is the same.

Having thus described the invention, what is claimed is:

1. In a cushioning device for a vehicle, having a frame and an axle, an oscillatory lever journaled at one end to said axle and yieldably connected at its other end to said lever, means adapted to cooperate with said lever to yieldably resist movement of said frame in one direction, and means associated with said lever and adapted to cooperate with the first mentioned means to yieldably resist movement of said lever in an opposite direction.

2. In a cushioning device for a vehicle, having a frame and an axle, an oscillatory lever connected at one end to said axle and yieldably connected at its other end to said frame, a cushioning element of yieldable material adapted to cooperate with said lever to yieldably resist movement of said lever in one direction, and means associated with said lever and adapted to cooperate with said cushioning element to resist movement of said lever in an opposite direction.

3. In a cushioning device for a vehicle, having a frame and an axle, an oscillatory lever connected at one end to said axle, yieldable bearings stationary with respect to said frame and yieldably supporting the other end of said lever, means adapted to cooperate with said lever to yieldably resist movement of said lever in one direction, and means associated with said lever and adapted to cooperate with the first mentioned means to resist movement of said lever in an opposite direction.

4. In a cushioning device for a vehicle, having a frame and an axle, an oscillatory lever connected at one end to said axle, yieldable bearings fixed with respect to said frame and yieldably supporting the other end of said lever, a cushioning element of yieldable material adapted to cooperate with said lever to resist movement of said lever in one direction, and means associated with said lever and adapted to cooperate with said cushioning element to resist movement of said lever in an opposite direction.

5. In a cushioning device for a vehicle, having a frame and an axle, an oscillatory lever connected at one end to said axle and yieldably connected at its other end to said frame, a cushioning element of yieldable material, and adjustable means associated with said lever and adapted to engage and cooperate with said cushioning element to resist movement of said lever.

6. In a cushioning device for a vehicle, having a frame and an axle, an oscillatory lever connected at one end to said axle and yieldably connected at its other end to said frame, a cushioning element of yieldable material, and adjustable means associated with said lever and adapted to engage and cooperate with said cushioning element to resist movement of said lever in one direction, and adjustable means associated with said lever and adapted to engage said cushioning element and cooperate therewith to resist movement of said lever in an opposite direction.

7. In a cushioning device for a vehicle, having a frame and an axle, an oscillatory lever connected at one end to said axle and pivotally connected at its other end to said frame, a closed hollow cushioning element of yieldable material arranged to be acted upon longitudinally by said lever and yieldably resist movement of said lever in one direction, and means associated with said lever and adapted to cooperate with said cushioning element to resist movement of said lever in an opposite direction.

8. In a cushioning device for a vehicle, having a frame and an axle, an oscillatory lever connected at one end to said axle and yieldably connected at its other end to said frame, a closed hollow cushioning element of yieldable material adapted to cooperate with said lever to yieldably resist movement of said lever in one direction, and means associated with said lever and adapted to cooperate with said cushioning element to resist movement of said lever in an opposite direction.

9. In a cushioning device for a vehicle, having a frame and an axle, an oscillatory lever connected at one end to said axle and terminating at its other end in a yoke, a housing carried by said frame, yieldable bearings carried within said housing and yieldably supporting the ends of said yoke, a cushioning element of yieldable material supported within said housing, and an arm carried by said yoke and adapted to cooperate with said cushioning element to yieldably resist movement of said lever.

10. In a cushioning device for a vehicle, having a frame and an axle, an oscillatory lever connected at one end to said axle and terminating at its other end in a yoke, a housing carried by said frame, yieldable bearings carried within said housing and yieldably supporting the ends of said yoke, a cushioning element of yieldable material supported within said housing, and an arm carried by said yoke and adapted to cooperate with said cushioning element to yieldably resist movement of said lever in one direction, and means associated with said lever and adapted to cooperate with said cushioning element to yieldably resist movement of said lever in an opposite direction.

11. In a cushioning device for a vehicle, having a frame and an axle, an oscillatory lever connected at one end to said axle and terminating at its other end in a yoke, a housing carried by said frame, yieldable bearings carried within said housing and yieldably supporting the ends of said yoke, a cushioning element of yieldable material supported within said housing, and an arm carried by said yoke and adapted to cooperate with said cushioning element to yieldably resist movement of said lever in one direction, and means associated with said lever and adapted to cooperate with said cushioning element to yieldably resist movement of said lever in an opposite direction and a retaining element carried by said housing and supporting said cushioning element therein.

12. In a cushioning device for a vehicle, having a frame and an axle, an oscillatory lever connected at one end to said axle and terminating at its other end in a yoke, a housing carried by said frame, yieldable bearings carried within said housing and yieldably supporting the ends of said yoke, a cushioning element of yieldable material supported within said housing, and an arm carried by said yoke and adapted to cooperate with said cushioning element to yieldably resist movement of said lever in one direction, and means associated with said lever and adapted to cooperate with said cushioning element to yieldably resist movement of said lever in an opposite direction and a retaining element carried by said housing and supporting said cushioning element therein and a compression plate carried by said cushioning element and disposed between said arm and the adjacent end of said cushioning element.

In testimony whereof, I have affixed my signature to this specification.

WILLIAM C. BROADWELL.

CERTIFICATE OF CORRECTION.

Patent No. 1,701,292.    Granted February 5, 1929, to

WILLIAM C. BROADWELL.

It is hereby certified that error appears in the printed specification of the above numbered patent requiring correction as follows: Page 3, line 16, claim 1, for the word "journaled" read "connected"; and that the said Letters Patent should be read with this correction therein that the same may conform to the record of the case in the Patent Office.

Signed and sealed this 9th day of April, A. D. 1929.

(Seal)

M. J. Moore,
Acting Commissioner of Patents.

and means associated with said lever and adapted to cooperate with said cushioning element to yieldably resist movement of said lever in an opposite direction.

11. In a cushioning device for a vehicle, having a frame and an axle, an oscillatory lever connected at one end to said axle and terminating at its other end in a yoke, a housing carried by said frame, yieldable bearings carried within said housing and yieldably supporting the ends of said yoke, a cushioning element of yieldable material supported within said housing, and an arm carried by said yoke and adapted to cooperate with said cushioning element to yieldably resist movement of said lever in one direction, and means associated with said lever and adapted to cooperate with said cushioning element to yieldably resist movement of said lever in an opposite direction and a retaining element carried by said housing and supporting said cushioning element therein.

12. In a cushioning device for a vehicle, having a frame and an axle, an oscillatory lever connected at one end to said axle and terminating at its other end in a yoke, a housing carried by said frame, yieldable bearings carried within said housing and yieldably supporting the ends of said yoke, a cushioning element of yieldable material supported within said housing, and an arm carried by said yoke and adapted to cooperate with said cushioning element to yieldably resist movement of said lever in one direction, and means associated with said lever and adapted to cooperate with said cushioning element to yieldably resist movement of said lever in an opposite direction and a retaining element carried by said housing and supporting said cushioning element therein and a compression plate carried by said cushioning element and disposed between said arm and the adjacent end of said cushioning element.

In testimony whereof, I have affixed my signature to this specification.

WILLIAM C. BROADWELL.

CERTIFICATE OF CORRECTION.

Patent No. 1,701,292.                                Granted February 5, 1929, to

WILLIAM C. BROADWELL.

It is hereby certified that error appears in the printed specification of the above numbered patent requiring correction as follows: Page 3, line 16, claim 1, for the word "journaled" read "connected"; and that the said Letters Patent should be read with this correction therein that the same may conformto the record of the case in the Patent Office.

Signed and sealed this 9th day of April, A. D. 1929.

(Seal)

M. J. Moore,
Acting Commissioner of Patents.